Aug. 4, 1959 T. J. RHODES 2,897,540
APPARATUS FOR MAKING PNEUMATIC TIRES
Filed Jan. 19, 1955

INVENTOR.
THOMAS J. RHODES
BY James J. Long
AGENT

United States Patent Office
2,897,540
Patented Aug. 4, 1959

2,897,540

APPARATUS FOR MAKING PNEUMATIC TIRES

Thomas J. Rhodes, Clifton, N.J., assignor to United States Rubber Company, New York, N.Y., a corporation of New Jersey Application January 19, 1955, Serial No. 482,823

3 Claims. (Cl. 18—5)

This invention relates to an improved apparatus for making pneumatic tires and more particularly it relates to an improved apparatus for molding an outer rubber covering on a tire casing.

This application is a continuation-in-part of my application Serial No. 227,033, filed May 18, 1951, now U.S. Patent 2,710,425.

One object of the invention is to provide an apparatus for making pneumatic tires which avoids any necessity for a transverse splice in the article, such as is necessary when tire treads are made by the conventional practice of continuously extruding rubber, cutting same into definite lengths, and splicing the ends of such lengths in annular form. Non-uniform shrinkage of the extruded lengths, as well as strains introduced in handling the lengths and applying them to a tire building drum, give rise to non-uniformity in the assembled article. Also, the transverse splicing of pneumatic tire treads, which is necessary in conventional practice, frequently gives rise to a state of dynamic unbalance when the tire is in use, because such a transverse splice represents a non-uniformity in the tread, causing an objectionable thumping, that is, a vibration or noise. The present invention seeks to eliminate the transverse splice as a cause of tire unbalance and non-uniformity.

Another object is the provision of a molding apparatus for forming the outer rubber covering of a tire from one or more vulcanizable rubber stocks by injection. Because of the relatively great size of pneumatic tires and the relatively great viscosity of rubber stock, and because of the limitations imposed on heating of the rubber stock during shaping thereof, due to the heat-vulcanizable nature of the stock, it has not generally been the practice to form a tire casing in a mold by injection of rubber stock into the mold cavity. The invention provides a novel and improved arrangement for distributing rubber stock uniformly and compactly in the mold cavity which obviates the foregoing difficulties.

Still another object is to provide a machine for making tire treads which affords highly accurate gauge control and therefore assures a more uniform product. Ordinary extrusion of rubber, as employed in conventional tire manufacture, is beset by certain inherent difficulties with regard to gauge control, due to the elastic memory of the rubber stock, which gives rise to shrinkage and swelling of the tire tread. The present invention avoids these difficulties by providing a practical molding apparatus in which the rubber stock is confined within a mold in precisely the desired shape until it is dimensionally stabilized.

Still a further object is to provide an apparatus for assembling a tire tread with a tire carcass which eliminates certain conventional manual operations and makes possible a more uniform and more firmly knit tire assembly.

The manner in which the invention accomplishes the foregoing and other objects and advantages will be made evident in the following detailed description, which is intended to be read with reference to the accompanying drawing, wherein:

Fig. 1 is a plan view, with parts broken away and parts in section, of a device of the invention for extruding the outer rubber covering of a tire from separate rubber stocks, directly onto the surface of a tire carcass;

Fig. 2 is a side elevational view of a portion of the apparatus of Fig. 1, taken along the line 2—2 of Fig. 1; and, Fig. 3 is a fragmentary sectional elevational view on a larger scale taken along the line 3—3 of Fig. 1.

The invention is applicable either to the manufacture of the type of pneumatic tire intended to be used with a separate, removable inner tube, or to the manufacture of the so-called tubeless type of tire, which has an integrally formed inner air-retaining member. In practicing the method of the invention the inner portion of the tire casing, i.e., the tire carcass itself, may be built up in the usual manner by superimposing plies of rubberized tire fabric, with the usual inextensible bead members contained in the marginal edges of the carcass. If the tire is to be of the tubeless type, the building procedure may be modified appropriately in accordance with conventional practice to provide for the inclusion of the usual air-retaining liner. The carcass assembly is most conveniently prepared in the form of an essentially flat band on the surface of a collapsible tire building drum.

The entire outer rubber covering that is thereafter superimposed on the tire carcass to complete the tire casing is usually referred to in the factory as a "tread," and it will be recognized that such rubber covering or tread is actually made up of distinct parts or zones. One such portion is represented by the sidewall of the tire, which is of course the portion of the carcass covering extending from the bead or rim approximately to the shoulder of the tire. Another such portion is the tread-portion proper, which is the actual road-contacting portion of the tire, and which extends across the crown area of the tire approximately from one shoulder to the other. The rubber portion underlying the tread-portion proper is known as the under-tread. As indicated, the entire rubber covering as a whole is sometimes referred to loosely as the tread. Although the entire tread may be made of a single kind of rubber stock, it is common to make the tread out of at least two kinds of rubber stock. Thus, the tread-portion proper, that is, the road-contacting portion, is suitably made of tread stock specially compounded for abrasion resistance, while the sidewalls are made of another stock compounded for optimum flexibility. In some constructions the sidewalls and under-tread are made of a single piece of the same stock, while at other times the undertread is made of a special, more economically compounded stock. Additional different kinds of stock may go to make up the tread as a whole, as when one of the sidewalls is made of, or at least surfaced with, a white rubber stock.

According to the invention, the tire tread is molded in annular form in a mold cavity of the desired annular shape defined between two separable mold members, one a relatively fixed mold member and the other a relatively movable mold member which is rotatable about the principal axis of the annular cavity. Such mold cavity is charged with rubber stock by extruding or injecting the stock at elevated temperature into the cavity at a given point on the surface of the relatively fixed member through an entrance passageway provided in the fixed member for this purpose. To fill the mold cavity with rubber material, the movable mold member is rotated during the extrusion or injection operation, thereby carrying the stock completely around the annular cavity from the entrance passageway, and such movement of the stock is made possible by continually introducing a thin film of liquid lubricant between the surface of the stock and the surface of the relatively fixed member. The liquid lubricant is introduced through an inlet passageway leading through the fixed mold member and opening into the mold cavity at a point on the internal surface of the fixed member in proximity to the entrance passageway for the rubber stock and spaced from such passageway in the direction of rotation of the movable mold part.

The typical practice of the invention contemplates particularly an apparatus for molding a pneumatic tire tread in annular form, especially in flat band form, in an annular cavity formed between an inner rotatable member or core, and an outer encircling member having the form of a shell or confining shield. The rubber stock is extruded through the wall of the outer member onto the surface of the inner rotatable member. Rotation of the inner member carries the stock completely around the annular cavity, and lubricant introduced between the surface of the stock and the surface of the fixed member prevents sticking of the stock. The inner rotatable mold member advantageously also carries the tire casing so that the tread is extruded directly onto the carcass. Most conveniently, the inner rotatable mold member has the general form of a tire building drum, and the tire carcass is built up on the surface of the drum, which is then inserted bodily in the extrusion machine for application of the tread. The application of the tread may be accomplished in two or more concurrent or successive distinct or combined extrusion operations, for the purpose of forming the various portions of the tire casing out of a plurality of different types of vulcanizable rubber stock, each type being particularly adapted to perform its intended function in the tire. Thus, there may be separately extruded or injected a tread stock specially compounded for abrasion resistance, a sidewall stock compounded for optimum flexibility and an under-tread material compounded of economical stock suitable for that purpose. The injection or stuffing devices associated with the mold members for depositing the rubber stocks on the tire carcass therein may be single extruders (i.e., extruders capable of extruding only one stock at a time), in which case as many separate extruders and die arrangements will be required as there are different kinds of rubber stock, or the injection or stuffing devices may be of the kind capable of handling more than one kind of rubber stock, either of the type known as dual extruders (for extruding two kinds of rubber stock, e.g., tread stock and sidewall stock, through a common die) or of the type known as triple extruders (for handling three kinds of rubber stock, e.g., tread stock, black sidewall stock and white sidewall stock).

In some cases it may be desirable to form only a portion of the outer rubber covering of the tire by injecting stock onto the rotating carcass as described, and to form a remaining portion of the outer rubber covering separately by calendering, extrusion, or other suitable operation, and subsequently apply such separately formed part to the previously injected portion. Thus, it may be desirable to form all of the tire tread assembly except for a white sidewall portion by the rotary injection method described, and to form the white sidewall stock itself into a strip of suitable form separately. The white sidewall strip can thereafter be applied to the previously prepared assembly.

After the extrusion or injection operation or operations, the tire building drum is removed from the enclosing mold members, with the tire carcass and molded tread contained thereon, and the drum is collapsed to permit removal of the thus-assembled raw tire casing. The casing is thereafter shaped, that is, it is converted from the form of an essentially flat annular band into typical tire shape. The shaping operation may be accomplished with the aid of differential pressure in the usual shaping box arrangement, wherein a tire curing bag is inserted in the casing as it is shaped. The assembly of shaped casing and curing bag is then deposited in the usual tire vulcanizing press wherein the various vulcanizable rubber stocks constituting the casing receive the necessary cure under heat and pressure. The final shape is thus imparted permanently to the tire, including any desired pattern of anti-skid grooves or the like in the tread surface. Alternatively, the raw tire in cylindrical band form may be inserted directly into the automatic type of combined shaping and vulcanizing press, containing an integral curing bag or blanket, and adapted to shape the band automatically into tire form as the press is closed.

Referring to the drawing, the embodiment of the invention shown therein provides for extruding and molding a tire under-tread and combined sidewall, and tread portion proper from separate rubber stocks directly onto the surface of a previously prepared tire carcass, conveniently while the carcass is in band form and contained on a collapsible tire building drum. This arrangement includes a central turntable assembly 10 composed of an upper generally triangular horizontal supporting plate 11 and a lower horizontal circular plate 12, connected together by a central vertical column 13, the lower end of which extends into a suitable bearing recess 14 in the base mounting 15 of the machine. The periphery of the circular lower horizontal plate 12 is provided with teeth 16, whereby the entire turntable assembly 10 may be rotated as a unit by means of a suitable driving motor 17 mounted vertically above the base 15 of the machine on a fixed supporting bracket 18 extending upwardly from the base. The driving motor 17 carries on the lower end of its vertical shaft a pinion gear 19 that meshes with the gear teeth 16 on the edge of the circular plate 12.

Three supporting arms 20, 21 and 22 extend generally radially from the upper plate 11 and are pivotally secured to the upper surface thereof by pivotal mountings 23, 24 and 25, respectively. At the outer ends of these arms there are rotatably supported tire building drums 26, 27 and 28, respectively, one end of the horizontal shaft of each drum passing rotatably through the associated supporting arm. The tire drum shafts carry driving gears 29, 30 and 31, each of which is adapted to engage a respective pinion gear driven by a corresponding driving motor 32, 33, 34 fixed to the base 15 of the machine at each of the three operating stations thereof. At each operating station there is also provided a trunnion 35, 36 and 37 extending upwardly from the base 15 of the machine and open at the top so that the shaft of the building drum can be lowered thereinto or raised therefrom as desired. The arrangement is such that when one end of the shaft of the tire building drum is in proper position in the trunnion bearing surface, the driving gear on the opposite end of the drum shaft operatively engages the pinion gear of the driving mechanism.

The drum 26 shown at the 7 o'clock position in Fig. 1 is in position for a tire carcass building operation; that is, when the drum 26 is in the position shown the operator builds up a tire carcass 26a thereon by superimposing plies of rubberized tire fabric on the drum and incorporating wire beads in the marginal edges in the usual manner. It will be understood that the carcass building operation requires rotation of the drum by the driving motor 32. After the carcass is built on the drum, the turntable 10 is rotated one-third of a revolution by the driving motor 17 to bring the drum into alignment with the first extruder 40. It will be understood that before the turntable 10 can be rotated the drums 26, 27, 28 must be lifted out of their respective supporting trunnions 35, 36, 37. For this purpose three vertical hydraulic cylinders 41, 42, and 43 are mounted on the base plate 12 of the turntable 10, and a piston rod 44 (Fig. 2) extending upwardly from each cylinder through a suitable opening 45 provided for this purpose in the upper plate 11 of the turntable 10 is pivotally secured at its upper end to the inwardly and upwardly projecting end of each supporting arm, such as the end 46 of arm 21.

The first extruder 40 has the usual entrance hopper 47 into which the rubber stock constituting the sidewall and under-tread portion of the tire casing is charged, and the feeding screw 48 (Fig. 3) thereof is rotated by the usual driving mechanism 49. This extruder is provided with a head assembly that is split diametrically, as best seen in Fig. 2, into a lower enclosing half or shell 50 that is fixed to the extruder body, and a movable upper enclosing shell 51 that is hinged to the lower half 50 at 52. The upper shell 51 may be swung upwardly about the hinge 52 by means of a vertical hydraulic cylinder 54 that is fixed to the base 15 of the machine and that has a piston rod 55 extending upwardly therefrom and pivotally attached at its upper end to a projecting arm 56 extending from the upper shell member 51 of the extrusion head. When the upper shell 51 is swung upwardly as indicated by the dotted lines in Fig. 2, and when the tire building drum, such as drum 27, has been elevated to the position shown by the dotted lines by means of hydraulic cylinder 42 and the turntable 10 rotated to bring the drum 27 and the extruder 40 into proper alignment, then the drum 27 may be lowered into position within the lower half 50 of the extrusion head, with one end of the drum shaft resting in the trunnion 36 and the driving gear 30 on the other end of the drum shaft in engagement with the drive 33. Thereafter, the upper half 51 of the extrusion head is lowered over the upper surface of the drum to completely enclose the same, with inwardly extending side flanges 58 of the extruder head in engagement with the lateral edges of the drum assembly.

The interior contour of the shell members 50, 51 constituting the enclosing extruder head is such that there is defined between the interior surface of the shell members and the exterior surface of a tire carcass 27a carried by the drum 27, an annular mold cavity 59 having the cross-sectional shape of the tire sidewall and under-tread portions. With the drum in position within the extruder head this cavity 59 is charged with rubber stock by the action of the screw 48 of the extruder 40, which delivers the heated vulcanizable stock 60 through an extrusion orifice 61 in the lower shell 50. The extrusion orifice 61 extends across the entire width of the inner surface of the shell 50. Simultaneously with this extrusion operation, the drum 27 is rotated in a clockwise direction as viewed in Fig. 3, by means of the drive 33, and in this way the rubber stock is carried completely around the annular cavity 59 to form the tire sidewall and under-tread 62 superimposed on the carcass 27a to which the rubber stock adheres. At the same time, a thin film of lubricant is continuously introduced between the surface of the moving rubber stock and the inner surface of the enclosing shells 50, 51, through a lubricant line 63 that extends through the body of the extruder head and terminates in a fine slit-like orifice 64 extending across the entire width of the inner face of the lower shell 50 parallel to the extrusion orifice 61 at a point slightly spaced therefrom in the direction of travel of the rubber. The lubricant thus-introduced during this operation is suitably a substance which is compatible with or soluble in the rubber so as not to interfere with adhesion of a subsequently applied rubber stock. Paraffin oil is well suited to this purpose. Rubber cements are also useful as lubricants, since they have a lubricating action when in a fluid condition. However, if rubber cement is used it must not be allowed to dry out or set up within the lubricant supply passages or on the surface of the enclosing shell. Upon exceeding one complete revolution of the drum 27, the rubber stock is sheared off at the extrusion orifice 61 leaving a complete annular band 62 of stock in the cavity 59.

Upon completion of the foregoing first extrusion operation, the turntable 10 is again rotated one-third of a revolution as described previously to bring the drum carrying the carcass and the extruded stock into alignment with the second extruder 65, shown at the 5 o'clock position in Fig. 1, which is intended to apply the tire tread portion proper, that is, the road-contacting portion of the tire casing. For this purpose the second extruder 65 is provided at its delivery end with a diametrically split extrusion head 66 into which the tire drum fits, and which is constructed in the same manner as the enclosing head of the first extruder 40, except that the contour of the interior surface of the head 66 of the second extruder 65 is such that there is defined between a tire building drum 46 contained therein and carrying a tire carcass 28a and an extruded sidewall and under-tread layer 67 of rubber stock, an annular cavity 68 having the cross-sectional shape of the tire tread proper. It will be understood that the cavity 68 is fed with rubber tread stock by the action of the extruder 65 through an extrusion orifice (not shown) contained in the extrusion head 66 and extending across the width of the cavity. The drum is rotated as before during the tread extrusion operation by means of the drive 34 and also lubricant is introduced between the surface of the moving rubber stock and the interior surface of the stationary enclosing head 66 through the lubricant supply line 69 passing from the outside of the extruder head into the mold cavity. Because the lubricant employed in the first extrusion operation was soluble in or compatible with the rubber, such lubricant does not interfere with adhesion of the tread stock to the under-tread portion. In the course of the final extrusion and rotation operation it is not essential that the lubricant be compatible with the rubber, because there is thereafter ordinarily no problem of adhering a subsequently applied body to the assembly, unless it is desired to apply a veneer of some sort to the outer surface of the casing.

On completion of the second extrusion operation the turntable 10 may be rotated one-third of a revolution again to bring the drum back to the initial 7 o'clock position indicated by drum 26 and the drum may be collapsed and the completed tire casing in band form removed for subsequent shaping and vulcanizing in the conventional manner. It will be evident that the foregoing arrangement makes possible production of tire casings at relatively great speed and with maximum convenience, since the carcass-building operation may be performed at one station, while the extrusion operations are being carried out simultaneously at their respective stations. Because of the manner in which the drum is rotated while the rubber stock is being extruded thereon, the distribution of the rubber stock to all parts of the mold cavity is assured since the stock is carried around by the rotation of the drum. Such rotation of the drum and travel of the stock is facilitated by the continuous introduction of lubricant, such as paraffin oil, between the surface of the rubber and the surface of the stationary enclosing extrusion head. As a result, a compactly and uniformly shaped tire casing is obtained. The various rubber stocks constituting the tire casing are firmly adhered to each other and to the tire carcass because they are united under pressure while the stock is at an elevated extrusion temperature. The inconveniences and variability of the conventional tread extrusion operation, and the conventional splicing operation, are avoided. Since the tread is formed in a closed mold cavity, it is uniform and dimensionally stable and the resulting tire is accurately balanced.

Having thus described my invention, what I claim and desire to protect by Letters Patent is:

1. An apparatus for assembling a pneumatic tire casing, comprising in combination a support, an arm pivotally attached to said support, means for rotating said arm about said pivotal attachment, a drum adapted to carry a tire carcass rotatably mounted toward one end of said arm, an extruding device spaced from said support, a head assembly attached to the delivery end of said extruder comprising an annular shell composed of two diametrically split haves, one such half being fixed to the extruder and the other such half being hinged to said fixed half, means for moving said hinged half away from said fixed half to facilitate depositing said drum within said shell by movement of said pivotal arm, a supporting member adjacent said shell for supporting said drum concentrically therewith when the drum is deposited within the shell, the inner surface of the shell being spaced from the drum when so supported so as to define therewith a cavity for at least a portion of a tire tread, said shell having an extrusion passageway leading therethrough from said extruder to said passageway, and means for rotating said drum within said shell.

2. An apparatus for forming the outer rubber covering of a tire casing from two different rubber stocks comprising in combination a drum for supporting a tire carcass in the form of an annular band, two spaced extruding devices, one for each of the two rubber stocks, an encircling head on each of said extruders for receiving the drum, means for moving the drum from one extruder to the other, the head on one of the extruders defining with the drum a cavity having the form of the sidewall and undertread portion of the tire, and the head on the remaining extruder defining with the drum a cavity having the form of the central road-contacting tread portion of the tire, each of said heads having an extrusion passageway therethrough leading from the respective extruder to the corresponding cavity, means for rotating the drum within each of said heads, and means for lubricating the inner surface of each head.

3. An apparatus for assembling a tire casing, comprising a central turntable, supporting members extending radially of the turntable, a drum rotatably mounted toward the outer end of each of said supporting members, means for rotating the turntable in a horizontal plane to bring said drums successively in a circular path to a carcass building station, a sidewall forming station, a tread forming station, means for rotating said drums at each of said stations, a first extruder located adjacent said circular path, a first head on said first extruder extending across said path at a point constituting said sidewall forming station for concentrically enclosing said drums successively and defining therewith a cavity having the shape of a tire sidewall portion, said first head having an extrusion passageway therethrough leading from said first extruder to said sidewall cavity and said first head also having a lubricant passageway therethrough leading to said sidewall cavity, a second extruder adjacent said path spaced from said first extruder, a second head on said second extruder extending across said path at a point constituting said tread forming station for concentrically enclosing said drums successively and defining therewith a cavity having the shape of a tire tread portion, said second head having an extrusion passageway therethrough leading from the second extruder to said tread cavity, and said second head also having a lubricant passageway therethrough leading to said tread cavity.

References Cited in the file of this patent

UNITED STATES PATENTS

| | | |
|---|---|---|
| 2,324,977 | Bosomworth | July 20, 1943 |
| 2,405,802 | Taber | Aug. 13, 1946 |
| 2,476,884 | Maynard | July 19, 1949 |
| 2,627,360 | Fink et al. | Feb. 3, 1953 |
| 2,693,007 | Rhodes | Nov. 2, 1954 |
| 2,710,425 | Rhodes | June 14, 1955 |
| 2,724,425 | Ostling | Nov. 22, 1955 |
| 2,798,253 | Rhodes | July 9, 1957 |

FOREIGN PATENTS

| | | |
|---|---|---|
| 520,560 | Great Britain | Apr. 26, 1940 |